United States Patent [19]

Richard et al.

[11] Patent Number: 5,410,478
[45] Date of Patent: Apr. 25, 1995

[54] APPARATUS FOR MEASURING THE DISPLACEMENT OF A VEHICLE, IN PARTICULAR AN ALL-TERRAIN ROBOT, AND A VEHICLE EQUIPPED WITH SUCH APPARATUS

[75] Inventors: Francois Richard, Les Ulis; Pierre Tournassoud, Paris, both of France

[73] Assignee: Alcatel Alsthom Compagnie Generale d'Electricite, Paris Cedex, France

[21] Appl. No.: 77,039

[22] Filed: Jun. 16, 1993

[30] Foreign Application Priority Data

Jun. 18, 1992 [FR]  France ................................. 92 07439

[51] Int. Cl.⁶ ..................... B62D 55/00; G06F 165/00
[52] U.S. Cl. ................. 364/424.01; 364/450; 364/561; 901/1; 180/9.1
[58] Field of Search ........... 364/559, 561, 560, 424.01, 364/424.02, 424.07, 449, 450; 180/6.7, 9.1, 191, 193, 194; 901/1; 318/587

[56] References Cited

U.S. PATENT DOCUMENTS

| | | | |
|---|---|---|---|
| 4,223,753 | 9/1980 | Bradbury | 180/6.2 |
| 4,815,319 | 3/1989 | Clement et al. | 73/493 |
| 5,117,930 | 6/1992 | Argouarc'hh | 180/9.1 |
| 5,248,007 | 9/1993 | Watkins et al. | 180/9.32 |
| 5,287,280 | 2/1994 | Yamamoto et al. | 364/426.03 |
| 5,337,846 | 8/1994 | Ogaki et al. | 180/8.2 |

FOREIGN PATENT DOCUMENTS

| | | |
|---|---|---|
| 2610885 | 8/1988 | France . |
| 3143234 | 5/1983 | Germany . |

Primary Examiner—Michael Zanelli
Attorney, Agent, or Firm—Sughrue, Mion, Zinn, Macpeak & Seas

[57] ABSTRACT

A primary odometer velocity is measured by a sensor on an odometer member travelling over terrain. The velocity is corrected by a calculating unit to take account of the inclination of the terrain at the point of contact where the member is in contact with the terrain. The inclination is measured by means of force sensors, e.g. measuring the forces applied to said member as a whole. An inertial unit supplies the orientation and the angular velocities of the vehicle. The device has application to navigation of all-terrain robots.

12 Claims, 5 Drawing Sheets

APPARATUS FOR MEASURING THE DISPLACEMENT OF A VEHICLE, IN PARTICULAR AN ALL-TERRAIN ROBOT, AND A VEHICLE EQUIPPED WITH SUCH APPARATUS

The present invention relates, in particular, to measuring the displacement of a vehicle, i.e. the distance actually travelled by the vehicle.

BACKGROUND OF THE INVENTION

The invention may be applied, in particular, when the vehicle in question is a robot designed to carry out work under conditions that are hostile to man. Such work may consist, for example, in reconnaissance, surveillance, repair, or cleaning operations. To perform such operations, the robot may be equipped with appropriate equipment, such as video cameras, measuring instruments, and tools. For example, such a robot may be useful in a nuclear facility subjected to high intensities of ionizing radiation after an incident, in the chemicals industry when there are risks of explosion, in agriculture, or in military activities.

Such a robot must be capable of moving over uneven terrain. To this end, it may be provided with wheels, legs, and/or crawler track drive units, that are fixed or moving relative to a vehicle body.

The robot must also be capable, preferably without human assistance, even remote, of navigating, i.e. of determining its position as accurately possible and at any time. Generally speaking, such a robot cannot use points of reference defined relative to the terrain for the purposes of providing such navigation. On-board navigating apparatus must then measure the displacement of the robot from a known starting point. Such a measurement is taken by integrating the components of a velocity vector measured at all times.

To this end, it is known for velocity measuring apparatuses to be used. Such apparatuses include inertial units co-operating with odometer counters to determine the velocity and the position of a vehicle having four wheels or two crawler track drive units. Velocity and position are determined by merging "inertial" or "accelerometer" data with odometer data resulting from counting wheel revolutions. Such data needs to be merged because the accelerometer data is inaccurate and requires position measurements to be regularly re-adjusted whenever they are obtained by double integration of accelerometer measurements.

Despite such data-merging, measurements made by known apparatuses remain subject to major errors under the usual conditions in which the above-mentioned work robots are used.

OBJECTS AND SUMMARY OF THE INVENTION

In particular, an object of the present invention is to reduce such errors.

To this end, the invention provides, inter alia, apparatus for measuring the displacement of a vehicle, in particular an all-terrain robot, the apparatus including:
a tread strip whose length constitutes a closed loop, the strip being constituted such that it does not slip lengthwise relative to the terrain on which it is made to bear;
an odometer member carrying and guiding the tread strip by enabling it to move lengthwise over a tread-way which is formed by the odometer member and which enables the strip to be made to bear on said terrain; and
an odometer sensor for supplying an odometer distance which is the distance travelled by the tread strip over the tread-way;
the apparatus further including:
means for defining a measurement axis;
contact-inclination measuring means for supplying a contact angle of inclination which, relative to the measurement axis, is the angle of inclination of the tangent to the tread-way at a point of contact where the tread strip bears against the terrain; and
displacement calculating means fed by said odometer sensor and by the contact-inclination measuring means, which calculating means, at least indirectly, multiply the odometer distance by the cosine of the angle of inclination so as to supply a corrected distance representative of the displacement of the odometer member relative to the terrain along the measurement axis.

Preferably, said odometer distance is a unit odometer distance measured over a time lapse corresponding thereto, said contact angle of inclination is measured during the same time lapse and also corresponding thereto, and said corrected distance is a corrected unit distance corresponding to the same time lapse. In which case, the vehicle includes integration means for supplying the sum of said corrected unit distances corresponding to said time lapses forming a continuous succession from an initial instant to a measurement instant, such that the sum is representative of the displacement of the odometer member along said measurement axis between the two instants.

For the purposes of understanding the scope of the invention, the following points should be taken into account.

The tread strip may be constituted in various ways, in particular by a flexible crawler track travelling over a non-circular tread-way which may be fixed relative to the vehicle body. The tread strip may also be constituted by the tread of the tire on a wheel rotating about an axis and guided by a bearing, the tread-way then being circular, rotating, and constituted by the rest of the wheel.

Generally speaking, it is preferable for the tread strip not to slip relative to the terrain either lengthwise or widthwise. But, when implementing the invention, measurements are distorted only if the strip slips lengthwise.

Generally speaking, it is preferable for the odometer member to support a significant fraction of the weight of the vehicle so as to cause the tread strip to bear against the terrain. But, when implementing the present invention, the contact force causing the tread strip to bear against the terrain need only be large enough to prevent the strip from slipping lengthwise relative to the terrain.

The measurement axis may be defined in various ways. In particular, it may be defined entirely relative to the vehicle: e.g. it can be the longitudinal axis of the Vehicle. It may also be defined entirely relative to the terrain: e.g. it can be the North-South horizontal axis. The measurement axis may also be defined partly relative to the vehicle and partly relative to the terrain: e.g. it may be the projection of the longitudinal axis of the vehicle on a horizontal plane. For navigating a vehicle that changes direction, it is advisable to use at least two measurement axes that are defined relative to the terrain.

The contact-inclination measuring means may be constituted in various ways. In particular, they may include a succession of contact sensors distributed over a portion of the tread-way of a crawler track to detect the point at which the crawler track bears against the terrain, or a mechanical or an optical feeler for locally measuring the inclination of the terrain relative to the vehicle body, or a camera forming an image of the tread strip and of the terrain, and followed by image analysis means, or force sensors giving the positions and the orientations of the set of contact forces exerted between the tread strip and the terrain. Such force sensors are described in French Patent No. 2,653,731 and U.S. patent application Ser. No.07/604,626 (Argouarc'h) which issued on Jun. 2, 1992 as U.S. Pat. No. 5,117,930 and describes a work vehicle to which the present invention may be applied.

The displacement calculating means may also be constructed in various ways. In particular, it is possible, but not necessary, for a step of the calculating process to show the value of the contact angle of inclination or of the cosine thereof explicitly. It is only necessary for the calculation to take into account the data supplied by the contact-inclination measuring means so that the corrected distance is effectively equal to the product of the odometer distance multiplied by said cosine.

BRIEF DESCRIPTION OF THE DRAWINGS

An embodiment of the present invention is described below by way of non-limiting example with reference to the accompanying diagrammatic figures.

Where the same element is shown in a plurality of figures, it is designated by the same reference symbol.

MORE DETAILED DESCRIPTION

Various dispositions that are common to the two vehicles given by way of embodiments of the invention are indicated below.

Where respective elements have similar functions in or relating to both vehicles, the element of the first vehicle is given a reference numeral that is less than 50, and the element of the second vehicle is given a reference numeral that is increased by 50 relative to the first reference numeral.

Among the dispositions which are common to both vehicles, some are known for prior vehicles.

With such known dispositions, a vehicle includes a vehicle body 2, 52, and a set of displacement members 4, 6, 8, 54, 56, 58 bearing against a terrain 10, 60 to carry the body and to enable it to be displaced.

At least one member in the set constitutes an odometer member 4, 54, and in turn includes the following elements:

a tread strip 12, 62 whose length constitutes a closed loop; the strip is constituted such that it does not slip lengthwise relative to the terrain when it bears thereagainst;

a core 14, 64 forming a tread-way for the tread strip; in the figures the tread-way coincides with the tread strip and is therefore designated by the same reference numeral; the core holds the strip on the tread-way while enabling the strip to move lengthwise thereover with a minimum amount of friction; the core brings the strip to bear against the terrain at a point of contact 16, 66; and a connection member 18, 19, 68 connecting the core to the vehicle body.

The vehicle further includes displacement measuring apparatus in turn including an odometer sensor 20, 70 for supplying an odometer distance which is the distance travelled lengthwise by the tread strip of the odometer member over the tread-way.

Figure 1:
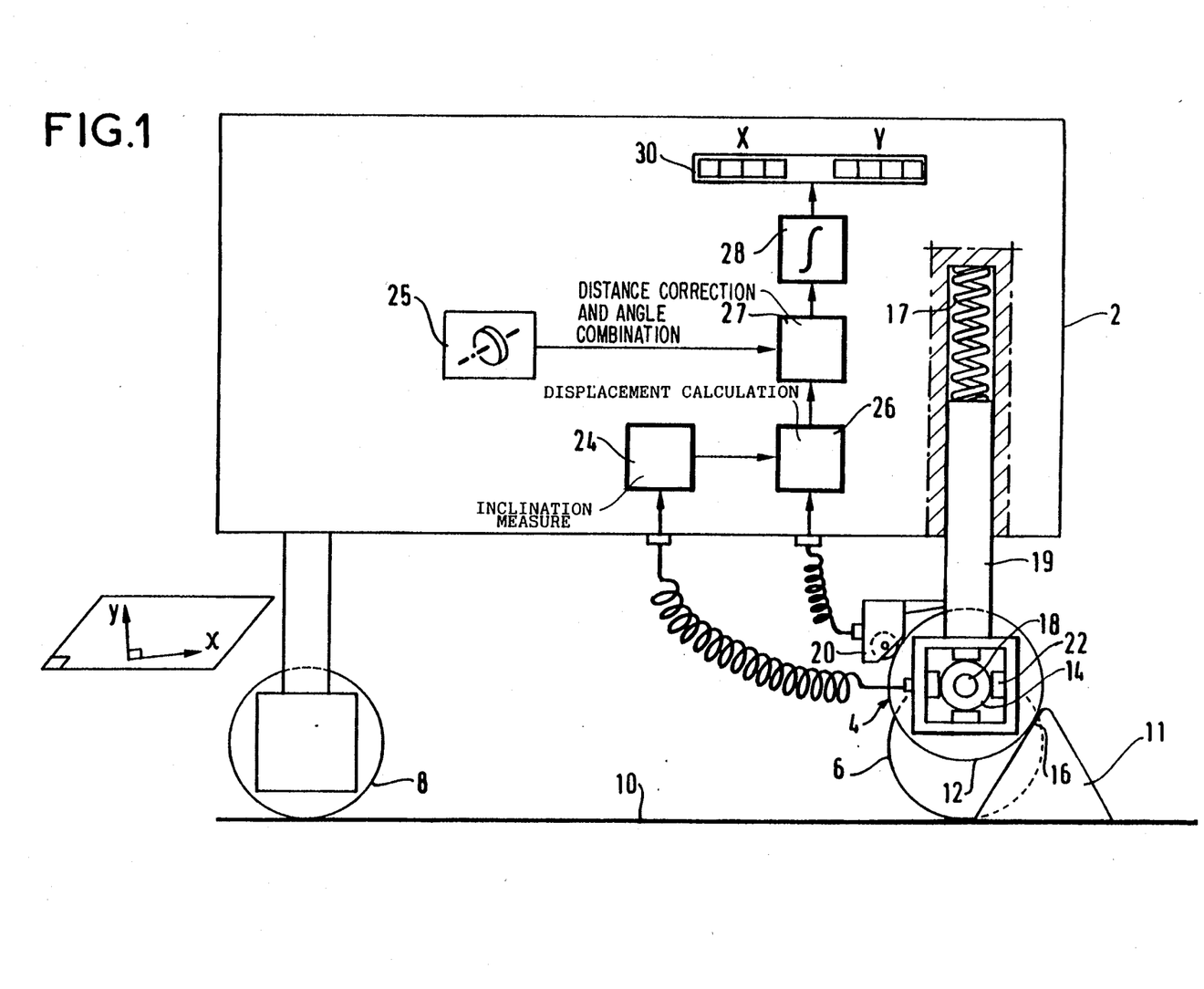
FIG. 1 is a side view of a first vehicle of the present invention, the vehicle being designed to illustrate the principles of the invention.
Figure 2:
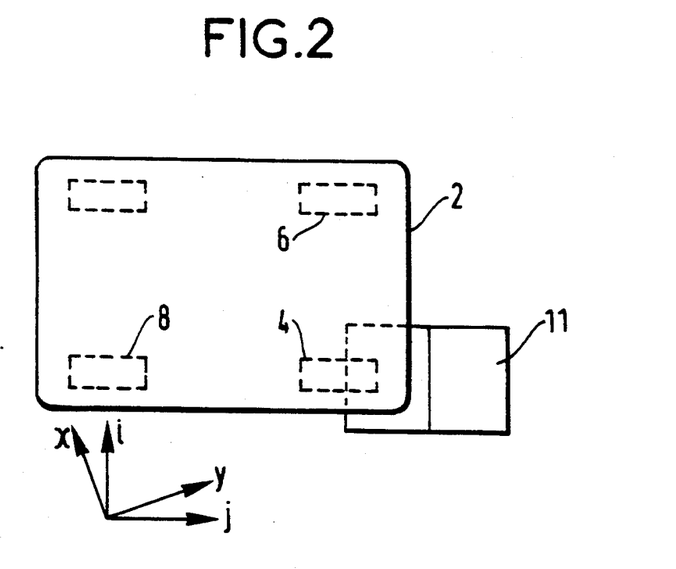
FIG. 2 is a plan view of the first vehicle to show the measurement axes along which the displacement of the vehicle is measured.

On the first vehicle, the displacement members are constituted by four wheels, each wheel being equipped with suspension means.

One of the wheels constitutes the odometer member 4, and its suspension member is represented by a telescopic support leg 19 slidably mounted vertically and without friction in the body 2, and by a spring 17 enabling a permanent vertical contact force to be maintained so that the wheel bears against the terrain in spite of the uneven portions thereof such as 11.

It is assumed that the vehicle is propelled by means that are not shown. The odometer sensor 20 measures the rotation of the wheel.

Figure 3:
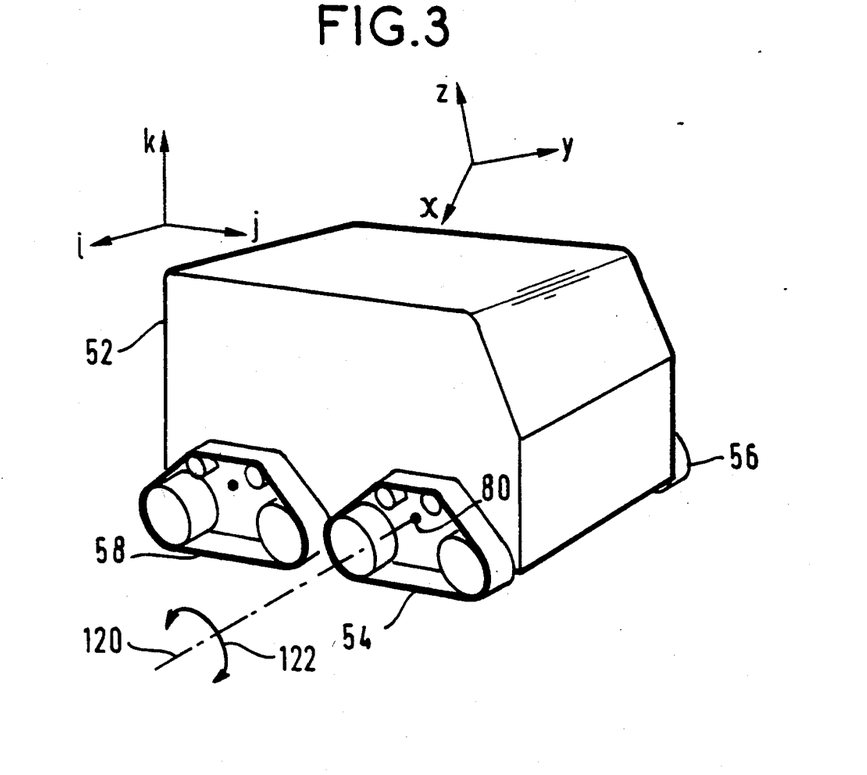
FIG. 3 is a perspective view of a second vehicle of the present invention, the second vehicle being designed to enable work to be carried out on uneven terrains.
Figure 4:
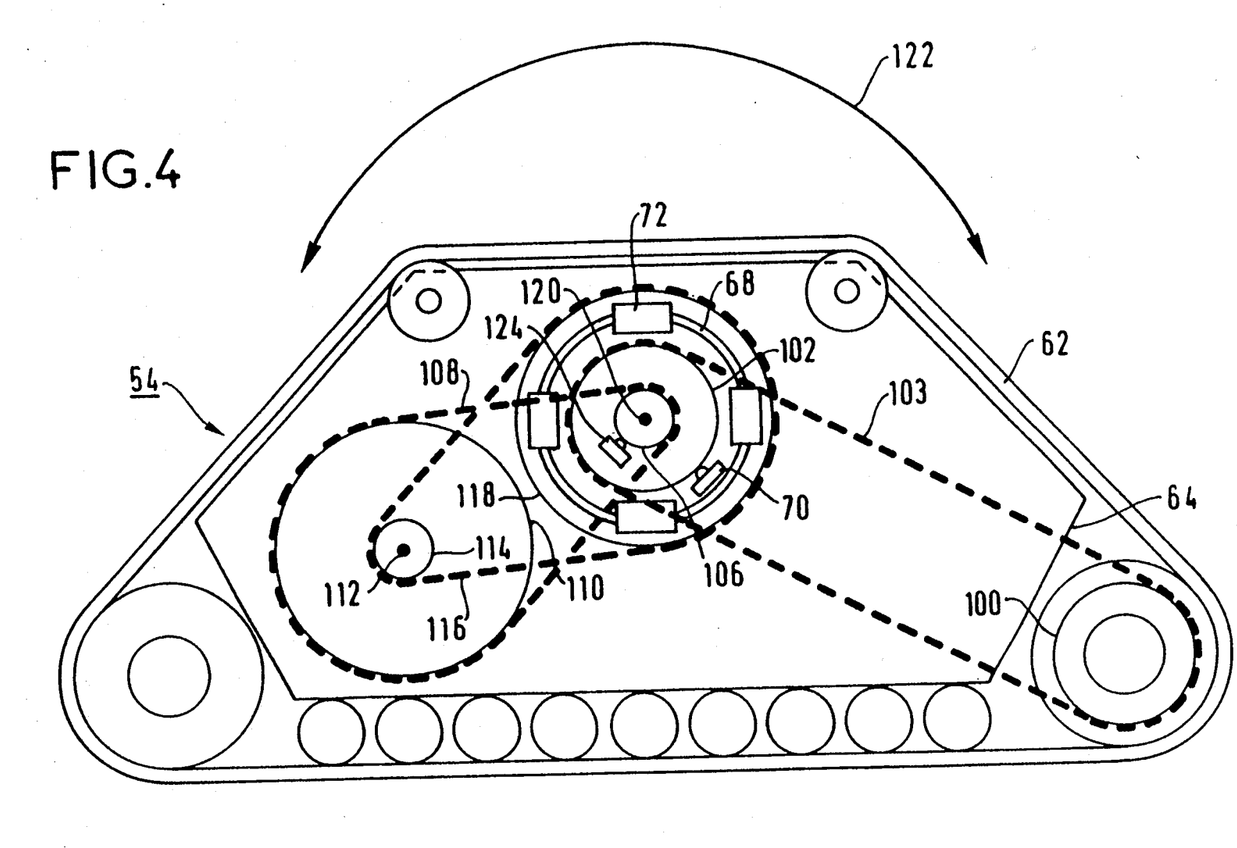
FIG. 4 is a side view of a crawler track drive unit of the second vehicle.
Figure 5:
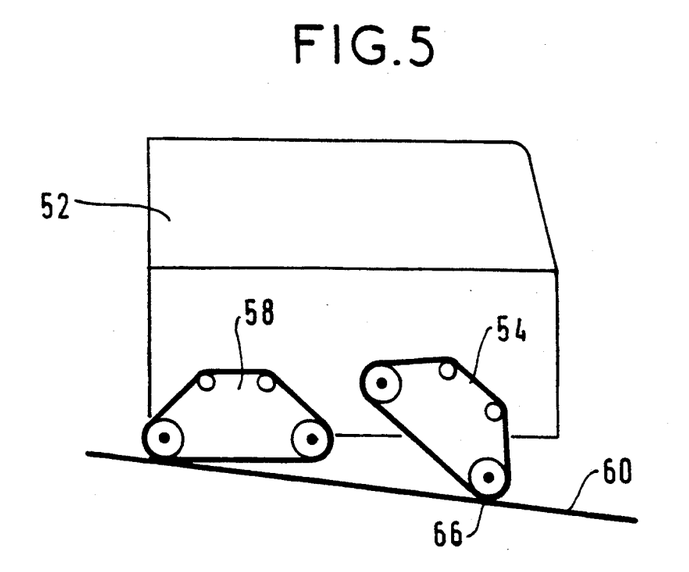
FIG. 5 is a view of the second vehicle on a sloping terrain.
Figure 6:
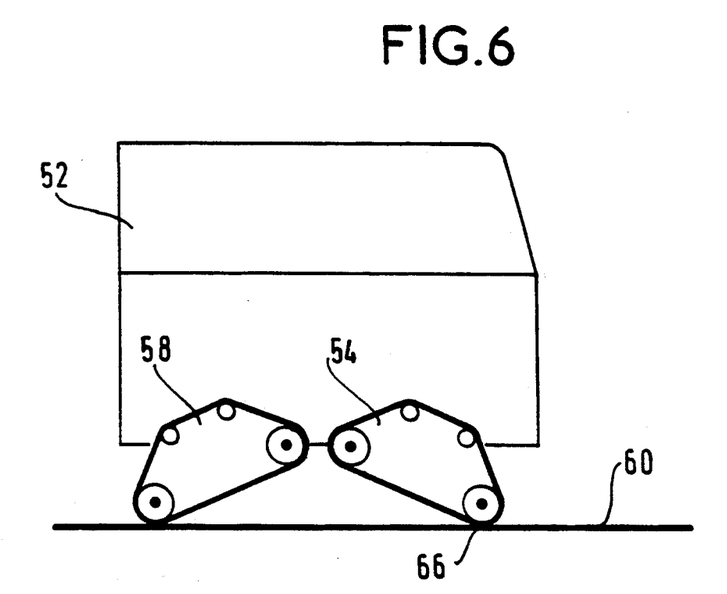
FIG. 6 is a view of the second vehicle during an operation intended to raise the body of the vehicle.

The displacement members of the second vehicle given by way of example are constituted by four crawler track drive units such as 54. The crawler track 62 constituting the tread strip of the drive unit is driven by a drive sprocket 100 in turn driven via a chain 103 by a travel drive sprocket 102 coupled to a motor (not shown) situated in the body of the vehicle. The odometer sensor 70 measures the rotation of the travel drive sprocket and may be disposed in the body of the vehicle.

In accordance with the present invention, and in each of the two vehicles, the displacement measuring apparatus takes into account a continuous succession of distinct odometer distances. The odometer distances constitute primary unit distances, each of which is travelled during a time lapse corresponding thereto.

The time lapses succeed one another continuously from an initial instant to a measurement instant.

The displacement measuring apparatus further includes the following elements:

contact-inclination measuring means for measuring a contact angle of inclination corresponding to each of said time lapses, which angle is the angle of inclination of the tangent to said tread-way at the point of contact relative to a measurement axes during the time lapse; a plurality of measurement axes may be defined, either relative to the vehicle, such as j for the first vehicle, or i, j, k for the second vehicle, or relative to the terrain, such as x, y for the first vehicle, and x, y, z for the second vehicle;

these measuring means are described in more detail below;

displacement calculating means including distance-correcting means 27, 76 for allocating a coefficient to each primary unit distance, which coefficient is equal to the cosine of the corresponding angle of inclination so as to obtain a corrected unit distance representative of the displacement of the odometer member relative to the terrain during the corresponding time lapse and along said measurement axis; and integration means 28, 78 for supplying the sum of said corrected unit distances, the sum constituting the odometer member displacement representing the displacement of the odometer member along the measurement axis and between said initial instant and said measurement instant.

Figure 7:
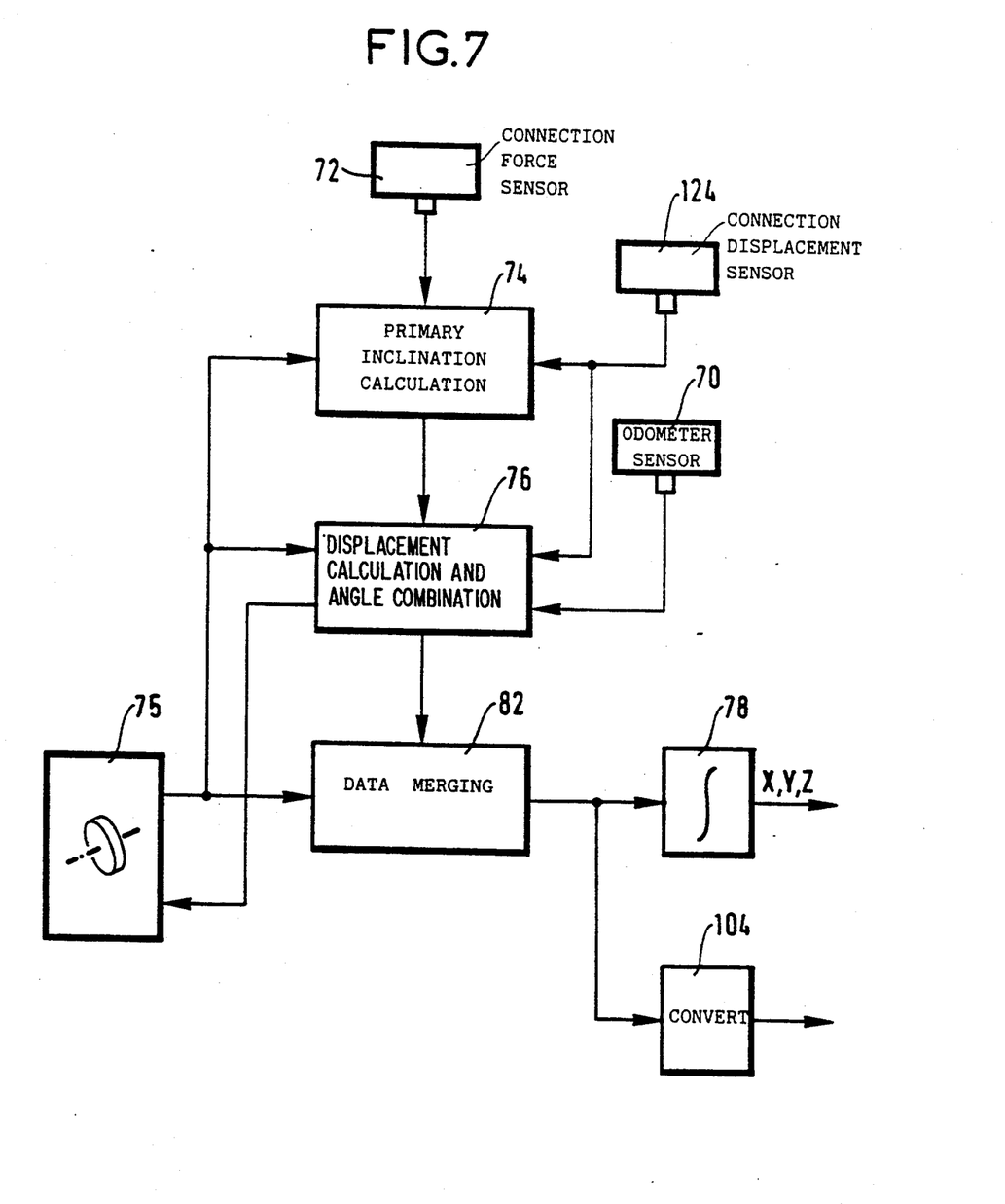
FIG. 7 is a block diagram of the displacement measuring apparatus of the second vehicle.

More precisely, the contact-inclination measuring means include primary contact-inclination measuring means 22, 72, 24, 74 for measuring a primary angle of inclination which is the angle of inclination of the tangent to the tread-way at the point of contact 16, 66 relative to a vehicle axis defined relative to the vehicle body 2, 52. The vehicle axis is parallel to a tread plane j, k which is the plane in which the tread-way extends lengthwise. The vehicle axis is more particularly the longitudinal axis j along which the vehicle normally moves. The contact-inclination measuring means further include an absolute orientation sensor 25, 75 for supplying the orientation of said vehicle axis j relative to at least one terrain axis, such as x, y, or z, defined relative to the terrain and constituting one of said measurement axes. The contact-inclination measuring means further include angle-combining means 27, 76 for combining the primary angle of inclination with said orientation of the vehicle axis so as to supply the contact angle of inclination. The angle-combining means are represented by a circuit 27 in the first vehicle in FIG. 1. In the second vehicle, as shown in FIG. 7, they are integrated in the displacement calculating means 76.

The primary contact-inclination measuring means include:

at least one connection-force sensor 22, 72 disposed so as to supply a connection-force measurement at least partially representing a system of connection forces transmitted via said connection member between the core 4, 64 of the odometer member and the vehicle body 2, 52; and primary inclination calculating means 24, 74 using the connection force measurement to supply said primary contact angle of inclination.

Since the weight of the odometer member and the tread-way are known, full knowledge of the system of connection forces enables the calculation means 24, 74 to gain full knowledge of the force which is exerted between the terrain and the tread strip, therefore of the point of contact 16 or 66 which is the point where the force intersects the tread-way, and therefore of the inclination of the tangent to the tread-way. However, it is not necessary for the force sensors to measure all six components of the system of forces. It is only necessary to know three components defining the force exerted in the tread plane, e.g. a vertical component along the k-axis, a horizontal component along the j-axis, and a torque about the i-axis. Suitable calculating means can be made by a person skilled in the art.

By way of very simple example, the situation of the first vehicle shown in FIG. 1 may be considered, assuming that the wheel 4 is not subjected to friction, thereby eliminating any torque about the i-axis, and that the j-axis is horizontal.

The sensors such as 22 measure a horizontal force which, relative to the vertical force, is, for example, 1.732 times greater. Simple calculation then shows that the flank of the obstacle 11 encountered by the wheel has an inclination of 60 degrees relative to the horizontal, i.e. that the primary contact angle of inclination is 60 degrees. Therefore, relative to the measurement axis j, the corrected unit distance is equal to half the primary unit distance measured by the odometer sensor 20.

To this end, the unit distance is corrected firstly at 26. In order to supply the displacement in the terrain frame of reference, the unit distance is further corrected secondly at 27 on the basis of the orientation data supplied by an inertial unit 25.

In order to supply two corrected unit displacements respectively along the x-axis and the y-axis, the second correction is performed twice in parallel by means of multiplication by the cosine of the angle between the j-axis and x-axis, and multiplication by the cosine of the angle between the j-axis and the y-axis. The corrected unit displacements along the x-axis and the y-axis are integrated in integration means 28 so as to supply the X and Y coordinates of the vehicle relative to an origin.

Said coordinates are written in a recording member 30.

Analogous but more complex calculations are performed in the second vehicle given by way of example. In the second vehicle, the connection member 68 enables the vehicle body 52 to be displaced relative to the odometer member 54, and the position and the orientation of the vehicle must be known relative to three axes. Therefore, the vehicle includes a connection-displacement sensor 124 for measuring, at least indirectly, relative displacement of the vehicle body relative to the core 64 of the odometer member 54 in a vehicle frame of reference constituted by three vehicle axes i, j, k. The displacement calculating means 76 add the relative displacement of the vehicle body to said odometer member displacement in the vehicle frame of reference so as to obtain a primary vehicle body displacement in the vehicle frame of reference.

An orientation sensor constituted by an inertial unit supplies the orientation of the vehicle frame of reference in a terrain frame of reference defined relative to the terrain and constituted by three terrain axes x, y, z.

The displacement calculating means use both the primary vehicle body displacement and the orientation of the vehicle frame of reference to supply vehicle displacements representative of the displacement of the vehicle body in the terrain frame of reference.

The relative displacements of the vehicle body 52 result, in particular from inclination motion of the core 64 of the odometer member 54 relative to the vehicle body about an axis of inclination 120 defined relative to the odometer member and parallel to the i-axis, which axis of inclination is a transverse axis. Such motion is represented by an arrow 122 in FIG. 4. More precisely, the connection-displacement sensor supplies an odometer member inclination velocity vector oriented along the axis 120 and having a magnitude representative of the angular velocity of the inclination motion. The tread plane is perpendicular to the axis of inclination, and meets said axis at an inclination center 80. The tread-way diverges from a circle whose center would be the inclination center.

The contact-inclination measuring means include sensors 124 supplying the position of the point of contact 66 in the vehicle frame of reference.

The displacement calculating means 76 use said odometer member 70 inclination vector and the position of the point of contact to supply an inclination center relative velocity representative of the velocity of the displacement of the inclination center relative to the terrain under the effect of said inclination motion and in the vehicle frame of reference. Said relative velocity is the vector product of said odometer member inclination vector multiplied by a vector connecting the inclination center to the point of contact. Integrating said relative velocity gives an inclination relative displacement which is added to the tread member displacement so as to supply one of said primary vehicle body displacements.

Naturally, full knowledge of the position and of the orientation of the vehicle body can be gained only by means of other data, e.g. by knowledge of the displacements of three inclination centers of three odometer members.

The inclination motion is made possible by the fact that the core 64 of the odometer member 54 is rotatably mounted about a tubular hub 68 constituting the above-mentioned connection member. The travel drive sprocket 102 is driven from the vehicle body via a travel shaft (not shown) passing through the hub. The inclination motion is also driven from the vehicle body via an inclination shaft passing through the shaft of the travel shaft, the inclination shaft carrying an inclination drive sprocket 106 at its end. Via a chain 108, the inclination drive sprocket drives a toothed wheel 110 rotating about an intermediate axis 112 defined relative to the core 64. The toothed wheel 110 coaxially drives a smaller-diameter toothed wheel 114 driving a chain 116 which bears against a toothed wheel 118 that is secured to the hub 68. Elements 106 to 118 Constitute step-down gearing for the inclination velocity.

The connection force sensors 72 are inserted into the hub 68 such that the forces transmitted by the hub pass through the sensors.

In fact, the vehicle shown includes four odometer members such as 54, 56, and 58 for suppling four respective primary unit distances.

The displacement calculating means 76 include odometer displacement calculating means for supplying a plurality of corrected unit distances on the basis of each of the primary unit distances, and for using each of the distances to supply a vehicle unit displacement estimate representative of a displacement of the vehicle body 52 during the corresponding time lapse.

Furthermore, the time lapses in question are determined such that each such vehicle unit displacement estimate constitutes an odometer velocity estimate, and the inertial unit 75 supplies an inertial velocity estimate for each of said time lapses, which inertial velocity estimate is obtained by integrating acceleration measurements, and is representative of at least one velocity of the body.

The displacement calculating means 76 then further include data-merging means 82 for merging said odometer velocity estimates and said inertial velocity estimate to supply an overall velocity estimate. For example, the data-merging means 82 also simultaneously constitute a Kalman filter for filtering the odometer velocity estimates and the inertial velocity estimates. By means of the integration means 78, the data-merging means supply the displacement of a point of the vehicle body to enable the position of the vehicle on the terrain to be known, and, prior to integration, and by means of a conversion member 104, the data-merging means supply the velocities of the various drive units in the vehicle frame of reference.

It can be understood that the various calculating means such as 74, 76, 78, 82, 104 may advantageously be installed in the same computer in the form of various items of software or of a single item of software grouping together the various functions mentioned above.

We claim:

1. Apparatus for measuring the displacement of a vehicle, the apparatus including:
    a tread strip whose length constitutes a closed loop, the strip constructed such that it does not slip lengthwise relative to the terrain on which it is made to bear;
    an odometer member carrying and guiding the tread strip by enabling it to move lengthwise over a tread-way which is formed by the odometer member and which enables the strip to be made to bear on said terrain; and
    an odometer sensor for supplying an odometer distance which is the distance travelled by the tread strip over the tread-way;
    the apparatus further including:
    means for defining a measurement axis;
    contact-inclination measuring means for supplying a contact angle of inclination which, relative to the measurement axis, is the angle of inclination of the tangent to the tread-way at a point of contact where the tread strip bears against the terrain; and
    displacement calculating means fed by said odometer sensor and by the contact-inclination measuring means, said calculating means, at least indirectly, multiply the odometer distance by the cosine of the angle of inclination so as to supply a corrected distance representative of the displacement of the odometer member relative to the terrain along the measurement axis.

2. Apparatus according to claim 1, said odometer distance being a unit distance measured over a time lapse corresponding thereto, said contact angle of inclination being measured during the same time lapse and corresponding thereto, said corrected distance being a corrected unit distance corresponding to the same time lapse;
    the apparatus further including integration means for supplying the sum of a plurality of corrected unit distances corresponding to a plurality of time lapses forming a continuous succession from an initial instant to a measurement instant, such that the sum is representative of the displacement of the odometer member along said measurement axis between the two instants.

3. A vehicle according to claim 1, in which said vehicle is an all-terrain robot.

4. A vehicle comprising:
    a vehicle body; and
    a set of displacement members bearing against a terrain to carry the vehicle body and to enable it to be displaced, at least one member in the set constituting an odometer member, said odometer member including:

a tread strip whose length constitutes a closed loop, the strip constructed such that it does not slip lengthwise relative to the terrain when it bears thereagainst;

a core forming a tread-way for the tread strip so as to hold the strip and to enable it to move lengthwise over the tread-way, the tread-way bringing the strip to bear against the terrain at a point of contact; and a connection member connecting the core to the vehicle body;

said vehicle further including displacement measuring apparatus including an odometer sensor for supplying an odometer distance which is the distance travelled lengthwise by the tread strip of the odometer member over the tread-way;

wherein said displacement measuring apparatus is operative to measure a continuous succession of distinct odometer distances corresponding to a plurality of time lapses succeeding one another continuously from an initial instant to a measurement instant, each of the odometer distances constituting a primary unit distance travelled during a time lapse corresponding thereto, said displacement measuring apparatus further including:

means for defining at least one measurement axis;

contact-inclination measuring means for measuring a contact angle of inclination corresponding to each of said time lapses, said angle is the angle of inclination of the tangent to said tread-way at said point of contact relative to one of said measurement axes during the time lapse; and displacement calculating means constituting:

distance-correcting means for allocating a coefficient to each of said primary unit distances, said coefficient is equal to the cosine of the corresponding angle of inclination so as to obtain a corrected unit distance representative of the displacement of the odometer member relative to the terrain during the corresponding time lapse and along said at least one measurement axis; and integration means for supplying the sum of said corrected unit distances, the sum constituting the odometer member displacement, the displacement being measured along the measurement axis and between said initial instant and said measurement instant.

5. A vehicle according to claim 4, in which said contact-inclination measuring means include primary contact-inclination means for measuring a primary angle of inclination which is the angle of inclination of the tangent to the tread-way at said point of contact relative to a vehicle axis defined relative to the vehicle body.

6. A vehicle according to claim 5, wherein said contact-inclination measuring means further include at least one orientation sensor for supplying the orientation of said vehicle axis relative to a terrain frame of reference including at least one terrain axis defined relative to said terrain and constituting one of said measurement axes, and angle-combining means for combining said primary angle of inclination with said orientation of the vehicle axis so as to supply said contact angle of inclination.

7. A vehicle according to claim 5, in which said treadway forms a loop in a tread plane, said vehicle axis being situated in said plane.

8. A vehicle according to claim 5, wherein said primary contact-inclination measuring means include:

at least one connection-force sensor disposed so as to supply a connection-force measurement at least partially representing a system of connection forces transmitted via said connection member between the core of the odometer member and the vehicle body; and primary inclination calculating means using the connection force measurement to supply said primary contact angle of inclination.

9. A vehicle according to claim 4, in which said connection member enables the vehicle body to be displaced relative to the odometer member;

the vehicle further including:

at least one connection-displacement sensor for measuring, at least indirectly, relative displacement of the vehicle body relative to the core of the odometer member in a vehicle frame of reference defined relative to the vehicle body and constituted by said measurement axes;

calculating means for adding the relative displacement of the vehicle body to said odometer member displacement in said vehicle frame of reference so as to obtain a primary vehicle body displacement in the vehicle frame of reference; and an orientation sensor for supplying the orientation of the vehicle frame of reference in a terrain frame of reference defined relative to the terrain and constituted by at least two terrain axes, constituting other ones of said measurement axes;

said displacement calculating means using both the primary vehicle body displacement and the orientation of the vehicle frame of reference to supply a vehicle displacement representative of the displacement of the vehicle body in the terrain frame of reference.

10. A vehicle according to claim 4, including a plurality of said odometer members to supply a plurality of respective ones of said primary odometer distances, said displacement calculating means including odometer displacement calculating means for supplying a plurality of said corrected unit distances on the basis of the primary unit distances, and for using each of the distances to supply a vehicle unit displacement estimate representative of a displacement of said vehicle body during the corresponding time lapse, said time lapses being determined such that each such vehicle unit displacement estimate constitutes an odometer velocity estimate, the vehicle body carrying an inertial unit for using acceleration measurements to supply an inertial velocity estimate for each of said time lapses, which inertial velocity estimate is representative of at least one velocity of the body, said displacement calculating means further including data-merging means for merging said odometer velocity estimates and said inertial velocity estimate to supply an overall velocity estimate.

11. A vehicle according to claim 10, in which said data-merging means constitute a Kalman filter for filtering said odometer velocity estimates and said inertial velocity estimate.

12. A vehicle according to claim 4, in which said vehicle is an all-terrain robot.

* * * * *